United States Patent [19]

Spaapen et al.

[11] Patent Number: 4,842,635
[45] Date of Patent: Jun. 27, 1989

[54] METHOD OF MANUFACTURING A LOW-PRESSURE MERCURY VAPOR DISCHARGE LAMP AND LOW-PRESSURE MERCURY VAPOR DISCHARGE LAMP MANUFACTURED BY MEANS OF THIS METHOD

[75] Inventors: Antonius J. Spaapen; Cornelis J. van den Broek, both of Roosendaal, Netherlands

[73] Assignee: U.S. Philips Corporation, New York, N.Y.

[21] Appl. No.: 220,925

[22] Filed: Jul. 18, 1988

Related U.S. Application Data

[63] Continuation of Ser. No. 107,857, Oct. 7, 1987, abandoned, which is a continuation of Ser. No. 792,615, Oct. 21, 1985, abandoned, which is a continuation of Ser. No. 490,803, May 2, 1983, abandoned.

[30] Foreign Application Priority Data

May 12, 1982 [NL] Netherlands ................. 8201944

[51] Int. Cl.$^4$ ............................................. C03B 23/09
[52] U.S. Cl. ....................................... 65/108; 65/55; 65/60.5; 65/112; 65/113; 313/493; 427/67
[58] Field of Search ............... 65/36, 55, 60.1, 60.5, 65/105, 108, 109, 112, 113; 313/493; 315/58, 60; 427/67

[56] References Cited

U.S. PATENT DOCUMENTS

| | | | |
|---|---|---|---|
| 2,103,585 | 12/1937 | Kimble et al. | 65/105 |
| 2,722,086 | 11/1955 | Mullen | 65/105 |
| 3,212,870 | 10/1975 | Condon | 65/105 |
| 4,157,909 | 6/1979 | Kachidurian | 65/269 |
| 4,324,447 | 4/1982 | van der Wolf et al. | 321/493 X |
| 4,426,602 | 1/1984 | Mollet et al. | 313/493 X |

FOREIGN PATENT DOCUMENTS 53-10570 1/1978 Japan .................................. 313/493

Primary Examiner—Robert L. Lindsay
Attorney, Agent, or Firm—Brian J. Wieghaus

[57] ABSTRACT

A method of manufacturing a low-pressure mercury vapor discharge lamp with a discharge vessel comprising two or more substantially parallel co-extending glass discharge tube portions (4 and 5) interconnected through a coupling which extend transversely to the wall of said tube portions. First, the inner wall of an elongate tube is provided with a luminescent material. Then, while heating at least a short zone of the wall, the elongate tube is then divided into two portions. End walls are formed during the division on which the luminescent layer extends the thickness of the tube wall and the temperature of the heated zone are chosen so that no particles of the luminescent material are enclosed in the glass of the end wall during said dividing process and fracture is avoided at least after cooling.

At least at the area of the transition from the end wall to the tube wall, the ratio AB/CD is 0.4 to 0.8.

13 Claims, 2 Drawing Sheets

METHOD OF MANUFACTURING A LOW-PRESSURE MERCURY VAPOR DISCHARGE LAMP AND LOW-PRESSURE MERCURY VAPOR DISCHARGE LAMP MANUFACTURED BY MEANS OF THIS METHOD

This is a continuation of application Ser. No. 107,857 filed Oct. 7, 1987, which is a continuation of Ser. No. 792,615 filed Oct. 21, 1985 which is a continuation of Ser. No. 490,803 filed May 2, 1983 all now abandoned.

BACKGROUND OF THE INVENTION

The invention relates to a method of manufacturing a low-pressure mercury vapour discharge lamp comprising a discharge vessel which is closed in a vacuum-tight manner and which comprises two or more substantially parallel co-extending glass discharge tube portions, the discharge spaces of two adjacent discharge tube portions being interconnected by a cross-coupling extending transversely to the wall of those tube portions, while during operation of the lamp the discharge passing through the greater part of the tube portions and the coupling in which method the coupling is provided after the inner wall of the tube portions has been provided with a luminescent layer and the tube portions have been closed at least at one end. The invention further relates to a low-pressure mercury vapor discharge lamp manufactured by means of this method. Such a method is known from the Netherlands Patent Application No. 7,902,571 to which U.S. Pat. No. 4,324,447 corresponds.

In the method described in the above mentioned Patent Application, the said tube portions are first provided with a luminescent layer. Subsequently, a mount (supporting an electrode and an exhaust tube) is secured to a first end of a tube portion and the other ends are closed, for example, by sealing. A luminescent layer is likewise present on the inner side of the closed ends. Subsequently, the coupling is provided.

The closure of the end of a tube coated with a luminescent material involves the risk of particles of the luminescent material being enclosed in the glass. The possibility (after the glass has solidified) of the occurrence of leakage and even of fracture is a real one. Additionally, stresses are produced in the glass near the closed end during the (later) step of providing the coupling between adjacent tube portions, which coupling engages at a comparatively short distance from this closed end, as a result of which there is a great risk of fracture in the glass at the area of the seal.

SUMMARY OF THE INVENTION

The invention has for its object to provide a method of manufacturing a low-pressure mercury vapor discharge lamp, in which the tube portions of the discharge vessels are reliably closed in a rapid and reproducible manner.

Therefore, according to the invention, a method of manufacturing a low-pressure mercury vapor discharge lamp as described in the opening paragraph is characterized in that, before the coupling is provided, the inner wall of an elongate open glass tube is coated with a luminescent layer, whereupon the tube, while heating at least a part of its glass wall, is divided into two tube portions, at the facing ends of which an end wall is formed which is substantially at right angles to the longitudinal axis of these tube portions and the thickness of which at least at the area of the transition to the tube wall is a factor 0.4 to 0.8 of the average thickness of the tube wall.

In the method according to the invention, first a uniform luminescent layer is applied to the inner wall of a comparatively long elongate tube in the usual manner. Thereafter the glass wall is heated to just above its softening temperature, for example, at a point at or near the center of the tube. The tube is then divided into two tube portions, for example, by drawing the (non-softened) ends of the tube away from each other. The temperature of the softened part and the thickness of the tube wall are chosen so that, when the tube is divided, the soft glass moves in the direction of the tube portions to be formed, the luminescent material being prevented from penetrating into the glass. The luminescent material is deposited as a uniform layer on the end wall to be formed. After solidification of the glass, such a surface stress and glass distribution are then obtained in the end wall that the aforementioned condition is satisfied according to which the thickness of the tube wall exceeds the thickness of the end wall at least at the area of the transition from the end wall to the tube. It has been found that with a deviating ratio of the wall thicknesses, fracture at the area of the end wall was liable to occur. It has further been found that with the said ratio during the later step of providing the coupling between adjacent tube portions, in which the glass wall in the proximity of the end wall is heated again, no fracture due to the occurrence of stresses in the glass occurred.

By means of the method according to the invention, not only a realiable and not particularly vulnerable closure of the tube portions of the discharge vessel is obtained, but also the method can be utilized in a comparatively simple manner in a mass production process.

Preferably, the coupling is formed in a manner described in the Netherlands Patent Application No. 7,902,571.

In a particular embodiment of the method according to the invention, the glass near the end of a tube portion after closure is blown in soft state against an abutment in order to form a flat end wall, whereupon the end of the tube portion is cooled. The possibility that fracture occurs is then a minimum.

In another embodiment of the method, the tube is rotated about its longitudinal axis during the division step. The glass wall is then heated uniformly at the area of the center of the tube, as a result of which the division step is effected smoothly.

The method according to the invention is suitable for manufacturing low-pressure mercury vapor discharge lamps having a discharge vessel consisting of two adjacent tube portions of substantially equal length extending parallel to each other. The electrodes are positioned on the same side of the lamp. The method according to the invention may also be used for manufacturing a lamp having a discharge vessel comprising three or more adjacent tube portions arranged parallel to each other. For example, a lamp having four tube portions located in the same plane or a lamp having four parallel tube portions arranged on a square is then obtained.

Lamps, which are manufactured by means of the method according to the invention, preferably serve as an alternative to incandescent lamps. By the use of the method, comparatively small tube portions are formed only after a larger elongate tube has been coated with a luminescent material in the manner usual for the said lamps. Especially the process of separately coating with a luminescent material these comparatively short tube portions intended to be used in the said compact fluorescent discharge lamps is time-consuming and complicated. By the use of the method according to the invention, this disadvantage is avoided.

The invention will be described more fully by way of example with reference to the drawing.

BRIEF DESCRIPTION OF THE DRAWING

In the drawing, successive stages of the method according to the invention are described with reference to FIGS. 1 to 5.

DESCRIPTION OF THE PREFERRED EMBODIMENTS

Figure 1:
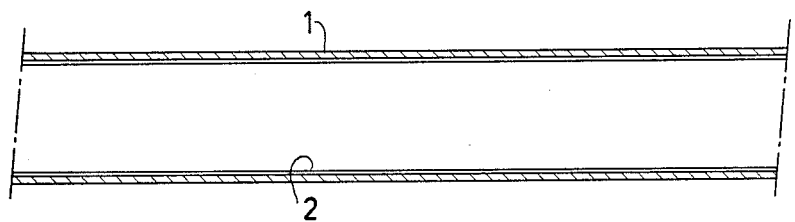
Figure 2:
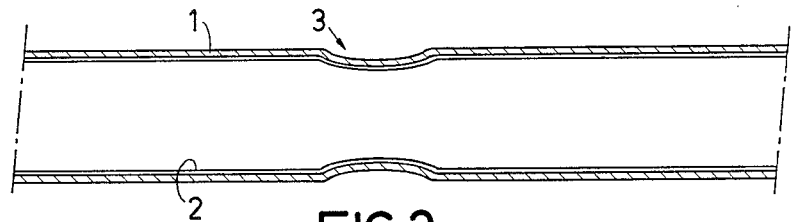
Figure 3:
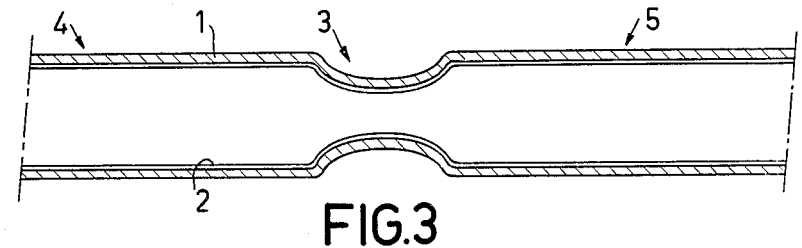

FIG. 1 shows in cross-section an alongate glass tube designated by reference numeral 1. The inner wall of this tube is provided with a luminescent layer 2. During the coating process, a luminescent material is brought in a suspension. In the suspension medium (such as butylacetate) a binder (such as nitro cellulose) is dissolved. The suspension is provided on the lamp wall as a layer. Then the suspension medium is evaporated by drying of the layer. Then the binder is removed by sintering. Subsequently, a short zone (3) of the wall (length, for example, approximately 3 mm) near the center of the tube is heated until the glass in situ softens (see FIG. 2). The tube is rotated about its longitudinal axis. The tube is then divided into two tube portions by drawing the ends (4 and 5) of the tube away from each other (see FIG. 3).

Figure 4:
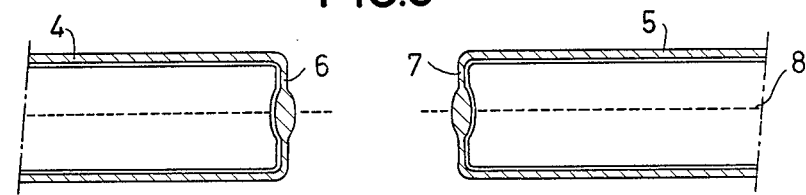
Figure 5:
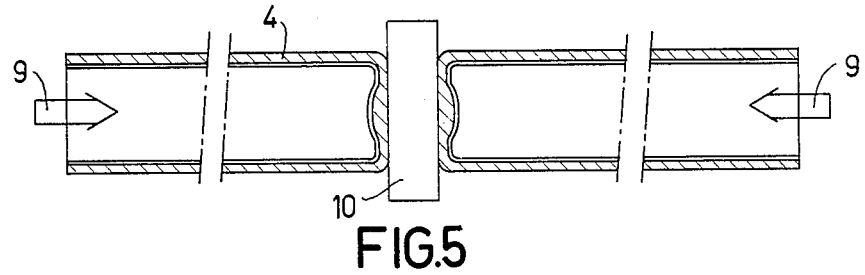

In the process described above, the parts 4 and 5 are drawn away from each other until at the area of the zone 3 a constriction is obtained, the outer diameter of which is approximately half the outer diameter before heating. The zone 3 continues to be heated and reaches such a temperature that the surface stress in the glass at the area of the construction reaches a value at which the glass wall separates. The soft glass then moves in the direction of the tube portions (4 and 5, respectively). The size of the heated zone, the temperature during heating and the velocity at which the parts 4 and 5 are drawn away from each other are chosen so that no luminescent particles are enclosed in the glass. These particles are pushed away, as it were, by the glass. An end wall is obtained on which the luminescent material surprisingly has deposited as a uniform layer. Addition steps (such as resintering and the like) are not necessary. The end wall extends substantially transversely to the longitudinal axis (8) of the tube portions. In order to obtain two tube portions of substantially equal length and to flatten the end wall, the still slightly soft end walls 6 and 7 (see FIG. 4) are blown by means of air (schematically indicated by the arrow 9) against an abutment 10 (see FIG. 5).

Figure 6:
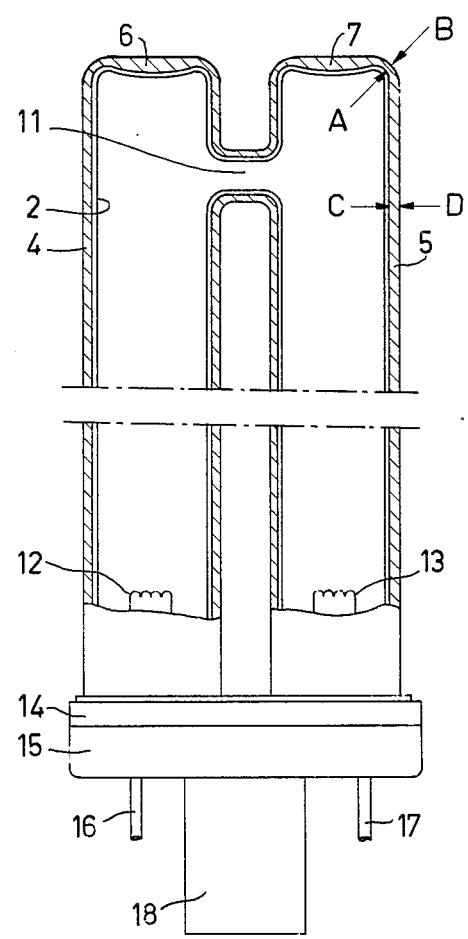
FIG. 6 shows a low-pressure mercury vapor discharge lamp, which is manufactured by means of the method according to the invention.

As a result of the method according to the invention, the thickness of the end wall (6 and 7, respectively) at least at the area of the transition to the tube wall is a ratio of 0.4 to 0.8 of the average thickness of the glass wall of the tube. If during the division step the temperature of the soft glass in the zone 3 is too low, a comparatively thin vulnerable end wall is obtained, the ratio then is smaller than 0.4. When too wide a zone (3) is heated, an end wall is obtained, which is comparatively thick (a ratio larger than 0.8), as a result of which not only a large risk of luminescent particles being enclosed occurs, but also during the step of providing the coupling, fracture occurs at the area of the transition from the end wall to the tube wall. This transition is denoted in FIG. 6 by AB. The average thickness of the tube wall is denoted by CD. In lamps obtained by means of a method according to the invention, the ratio AB/CD amounted to approximately 0.55.

In the method, the said tube portions 4 and 5 are subsequently cooled and arranged parallel to each other. The mounts with electrodes, exhaust tubes and the like are then secured in the still open ends. Thereafter, the coupling between the two tube portions is provided by means of a method of the kind described in the Netherlands Patent Application No. 7,902,571. The coupling is denoted in FIG. 6 by reference numeral 11. The discharge vessel (which comprises two substantially parallel co-extending glass discharge tube portions 4 and 5 interconnected by the coupling 11, extending transversely to the wall of said discharge tube portions) is then exhausted, filled with rare gas and closed in a vacuum-tight manner. Subsequently, mercury is dosed into the discharge vessel. The electrodes 12 and 13 are located on the same side of the lamp. An annular part 14 (consisting, for example, of aluminium) is then secured to the discharge vessel, for example, by means of cement. This part has clamped to it a lamp base 15, which is further provided with current connection pins 16 and 17 and a sheath-like protuberance 18 which accommodates a starter (see NL-TV 8003277).

In a practical embodiment, the length of the tube portions 4 and 5 was approximately 14 cm. The inner diameter was approximately 1 cm. The thickness of the glass wall (CD) of the tube portions 4 and 5 was to approximately 1.3 mm. The thickness of the end walls 6 and 7 near the longitudinal axis of the tubes 4 and 5 was approximately 1.2 mm. The thickness of the end wall near AB was approximately 0.7 mm. The inner wall of the tube portions was coated with a luminescent layer consisting of a mixture of two luminescent substances, i.e. green luminescing terbium-activated cerium magnesium aluminate and red luminescing yttrium oxide activated with trivalent europium. The lamp filled with argon as rare gas (pressure 400 Pa) had a luminous flux of approximately 600 lumen with a power supplied to the lamp of 9W (operating voltage 60V, current 170 mA).

What is claimed is:

1. A method of manufacturing a low-pressure mercury vapor discharge lamp comprising two parallel tube parts and a transverse section joining said tube parts near adjacent ends, said method comprising:
   (a) providing a single elongate circular cross-section glass tube having a given diameter and a given tube wall thickness;
   (b) coating the interior of said tube with a luminescent material; and
   (c) dividing said coated tube into two tube parts having respective facing end walls each having a thickness at least at an area of transition between the tube wall and the end wall between 0.4 and 0.8 times said given tube wall thickness, comprising
   heating an axial section of said coated tube over a length less than said diameter causing said axial section to rise to a temperature such that the heated glass softens,
   drawing cooler portions of said coated tube away from each other until a construction is formed in said heated axial section having a diameter approximately half said given diameter, and heating said axial section with said cooler portions fixed relative to each other until said constriction is at a temperature such that the heat-softened glass moves in the direction of the cooler portions, said single tube separating into said two tube parts and said heat-softened glass forms respective end walls on said tube parts, said wall thickness being selected and said dividing step being carried out such that the movement of the soft glass towards the cooler portions forms the end walls and avoids penetration of the luminescent material into the glass.

2. A method as claimed in claim 1, wherein said coated tube is rotated continuously after said coating step.

3. A method as claimed in claim 1, wherein the axial section heated has a length approximately 30% of said given diameter.

4. A method as claimed in claim 1, further comprising the step of pressing said end walls against an abutment while still soft and blowing the glass so as to flatten said end walls.

5. A method as claimed in claim 1, wherein the inner diameter of said tube is substantially 1 mm and said tube has a nominal wall thickness substantially equal to 1.3 mm.

6. A method as claimed in claim 5, wherein the length of said heated axial section, the temperature of said heated axial section and the velocity at which said cooler portions are drawn away from each other are chosen so that said end walls have a thickness near the longitudinal axis of the respective tube part substantially equal to 1.2 mm.

7. A method as claimed in claim 5, wherein said tube parts have an area of transition where said end walls merge into the tube wall, and the length of said heated axial section, the temperature of said heated axial section and the velocity at which said cooler portions are drawn away from each other are selected such that said area of transition has a thickness which is 0.4 to 0.8 times the nominal thickness of the tube wall.

8. A lamp manufactured by means of a method as claimed in claim 1.

9. A lamp as claimed in claim 8, wherein the inner diameter of the tube parts is substantially 1 mm and said tube has a nominal wall thickness substantially equal to 1.3 mm.

10. A lamp as claimed in claim 9, wherein said end walls have a thickness near the longitudinal axis of the respective tube part substantially equal to 1.2 mm.

11. A lamp as claimed in claim 8, where each tube part has an area of transition where said end walls merge into the wall of a respective tube part and the thickness of the tube part in the transition area is 0.4 to 0.8 times the nominal thickness of the tube wall.

12. A lamp manufactured by means of a method as claimed in claim 4.

13. A lamp manufactured by means of a method as claimed in claim 2.

* * * * *